United States Patent [19]

Hsia

[11] Patent Number: 5,912,669
[45] Date of Patent: Jun. 15, 1999

[54] SCREEN NAVIGATION METHOD

[75] Inventor: Hanna Hsia, Mission Viejo, Calif.

[73] Assignee: NetManage, Inc., Cupertino, Calif.

[21] Appl. No.: 08/639,788

[22] Filed: Apr. 29, 1996

[51] Int. Cl.⁶ .................................................. G06F 3/14
[52] U.S. Cl. .......................................... 345/357; 707/507
[58] Field of Search ............................. 395/671, 200.79, 395/200.34, 200.47, 200.48, 200.49; 345/357; 707/507

[56] References Cited

U.S. PATENT DOCUMENTS

| | | | |
|---|---|---|---|
| 5,204,947 | 4/1993 | Bermstein et al. | 395/157 |
| 5,395,242 | 3/1995 | Slye et al. | 463/1 |
| 5,499,330 | 3/1996 | Lucas et al. | 395/145 |
| 5,596,714 | 1/1997 | Connell | 395/183.14 |
| 5,600,789 | 2/1997 | Parker et al. | 395/183.14 |
| 5,604,896 | 2/1997 | Duxbury et al. | 395/200.57 |
| 5,623,656 | 4/1997 | Lyons | 395/610 |
| 5,657,480 | 8/1997 | Jacabson | 395/555 |
| 5,659,547 | 8/1997 | Scarr et al. | 395/182.02 |
| 5,704,029 | 12/1997 | Wright, Jr. | 395/149 |
| 5,712,979 | 1/1998 | Graber et al. | 395/200.11 |

*Primary Examiner*—Lance Leonard Barry, Esq.
*Attorney, Agent, or Firm*—Steven C. Sereboff; Sereboff & Buyan, LLP

[57] ABSTRACT

A terminal emulation program for an IBM host is described. The program can record scripts (mini-programs) of IBM host sessions. For each action or event, as desired, the program records an appropriate script. Scripts may be created for connecting to and disconnecting from the IBM host, for sending key strokes, for sending playback-time inputs, for awaiting a certain screen, and for importing displayed IBM host data. The scripts are stored in a file on a PC and may be replayed either from the terminal emulator, from Windows, or via OLE.

12 Claims, 14 Drawing Sheets

SCREEN NAVIGATION METHOD

NOTICE OF COPYRIGHTS

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

BACKGROUND OF THE INVENTION

1. Field of the Invention

The present invention relates generally to PC to host communications, and more particularly to terminal emulation on a PC for communications with an IBM mainframe or minicomputer.

2. Description of Related Art

Today's enterprise features universal personal and network computing. In most cases the same enterprise is a long-term user of and investor in International Business Machines Corp. (Armonk, N.Y.) ("IBM") host computing systems and technology. In the early 1980s, the arrival of the Personal Computer (PC) in IBM host computing environments created a PC-to-IBM host connectivity market. Today this hardware/software market is approximately a $1 billion segment of the networking industry.

The PC-to-IBM host connectivity market has gone through several transitions over the past decade. In the early 1980s the market formed around the replacement of Control Unit Terminals ("CUT mode devices") with hardware/software combinations such as the "IRMA" card. The first major transition in this market began in 1985 with IBM's introduction of distributed function terminal ("DFT") mode in its cluster controllers (3X74), terminals, and modified PCs. PC-to-host connectivity vendors responded by developing DFT mode software for PC-DOS, an effort which required development of complete SNA protocol engines.

By the late 1980s many organizations were swept up in the process of connecting PCs together into Local Area Networks (LANs). This gave rise to another transition in the market, the connections of LAN-attached PCs to IBM hosts. The use of connectivity methodologies that deny PCs powerful access to local and wide area networks (such as coax/twinax to fixed function cluster controllers) is on the decline, being replaced by gateway and direct connect configurations that treat IBM hosts as one of several internetwork servers.

In 1990 the transition in the Intel PC install base to Windows 3.X began. Windows is a product of Microsoft Corp. (Redmond, Wash.). The effect upon the IBM host connectivity market was immediate and profound. New, high growth companies emerged that specialized in Windows-to-IBM host connectivity. For the first time, changes in the desktop computing environment begat significant changes in the use of IBM host computers.

In the typical PC-DOS-to-IBM host connectivity installation, terminal emulation software allows operation of the PC as a dual function device: both PC-DOS application processor and host terminal. The typical PC-DOS based 3270 or 5250 product may also include other features for host connectivity such as application programming interfaces and/or file transfer software. However, the limitations of PC-DOS itself (memory management and user interface in particular) hinder general development and deployment of more powerful PC-to-host connectivity systems.

The widespread adoption of Windows 3.X on Intel Desktop PCs created a market for more innovative PC-to-IBM host connectivity software. Graphical User Interface technology has been applied to the task of simplifying the look and feel of older host applications. Enhanced mode memory management allows for more reliable deployment of underlying PC-to-host communications technology such as Advanced Program to Program Communications/Logical Unit ("APPC/LU") 6.2 engines. Task switching enables the concurrent use of various PC-to-host applications and services on a single desktop. All of these innovations represent incremental improvement over the DOS-to-IBM host computing environment.

One important aspect of IBM host connectivity is host data incorporation. Host data incorporation can generally be broken down into two approaches: screen scraping based on the High Level Language Application Programming Interface "(HLLAPI") applications programming interface ("API"), and client/server systems based on APPC/LU 6.2. HLLAPI allows users to write high level language programs for automating repetitive tasks and console operations. It also allows for masking complex applications from the user, consolidating several tasks into one simple task, monitoring tasks without human intervention and simplifying existing host applications.

In coding HLLAPI applications, the corporate developer is presented with at least two alternatives. One is to write a traditional Windows application in C that reads and writes from the host display session presentation space as needed to incorporate host display session data into Windows applications. Another is to write a Visual Basic application that includes Visual Basic custom controls that perform a similar set of encapsulated host presentation space read/write functions and services. Both methods may consume anywhere from a few days to a few months worth of development effort, depending upon the complexity of the data incorporation problem and the skill of the developer.

Although IBM host applications can be written having a more contemporary user interface, most IBM host applications are old, and it is difficult to make significant changes to them. These older IBM host applications are commonly known as "legacy applications." One defining characteristic of legacy applications is that they are navigated linearly and sequentially. Thus, where some IBM host applications may be accessed using Software Query Language ("SQL"), legacy applications typically cannot. Furthermore, SQL access is generally limited to relational database management systems ("RDBMSs").

Yet, although the legacy applications are old, the data stored with them and typically accessible only through them can be quite new and relevant. Thus, despite the age of the legacy applications, there continues to be a great need to use them.

It is therefore a first object of the invention to provide simplified navigation of IBM host applications. It is also an object of the invention to provide simplified navigation of IBM host applications using a PC-based terminal emulator. It is a further object to simplify for users the task of incorporating data from an IBM host application into a Windows applications. It is a further object to provide a system in which a network administrator or IS professional can build software relationships that facilitate such data incorporation. Other objects of the invention are to provide these other objects in an economical fashion requiring a minimum of modification to legacy applications and IBM hosts.

These objects and others are provided by the screen navigation method of the present invention.

SUMMARY OF THE INVENTION

In accordance with the present invention, there is provided a screen navigation system for a terminal emulator in which the path to a desired screen of an IBM host application is recorded, and then, when desired, the recording is replayed to return to the desired screen. Path recordings are created as "navigation path" objects. The navigation path objects are built by an administrator using a special terminal emulator. The special terminal emulator records necessary information while the administrator navigates through IBM host applications. After the navigation path object is created, it may be displayed graphically and edited.

A number of additional commands are provided in the invention. These include commands for: selecting data areas of an IBM host screen for capture to the terminal emulator, opening a window on the terminal emulator for data input which is then typed into a desired position in the IBM host screen, and selecting a series of commands to be repeated.

To use the navigation path object, an ordinary user may start the special terminal emulator and select the navigation path object for playing. Alternatively, the navigation path object, stored in a Windows file, may be selected and run from Windows Container Applications, the Windows desktop or File Manager/Explorer.

DESCRIPTION OF THE DRAWINGS

These and other advantages of the present invention are best understood with reference to the drawings, in which, in varying detail.

These and additional embodiments of the invention may now be better understood by turning to the following detailed description wherein a preferred embodiment is described.

DETAILED DESCRIPTION OF THE PREFERRED EMBODIMENT

Throughout this description, the preferred embodiment and examples shown should be considered as exemplars, rather than limitations on the apparatus and methods of the present invention.

In accordance with the invention, a special terminal emulator program is used to first record actions and events during an IBM host session, and then, as desired, to replay all or part of the recording. The recording comprises a number of scripts, where each action or event preferably will be recorded as one script. These scripts are effectively a program.

The form, syntax and structure of the scripts may be designated using well-known techniques. The particular form of the script language is not believed to be critical to the invention.

It is contemplated that in the typical embodiment of the invention, a more experienced or skilled user of the IBM host and the terminal emulator will do the recording, and ordinary users are contemplated as doing the playback. In the description herein, the more experienced or skilled user will be referred to as the "administrator," and an ordinary user will be referred to as a user. This terminology is for convenience, and should not be considered in a limiting sense.

The Hardware Architecture of the Preferred Computer System

Figure 1:
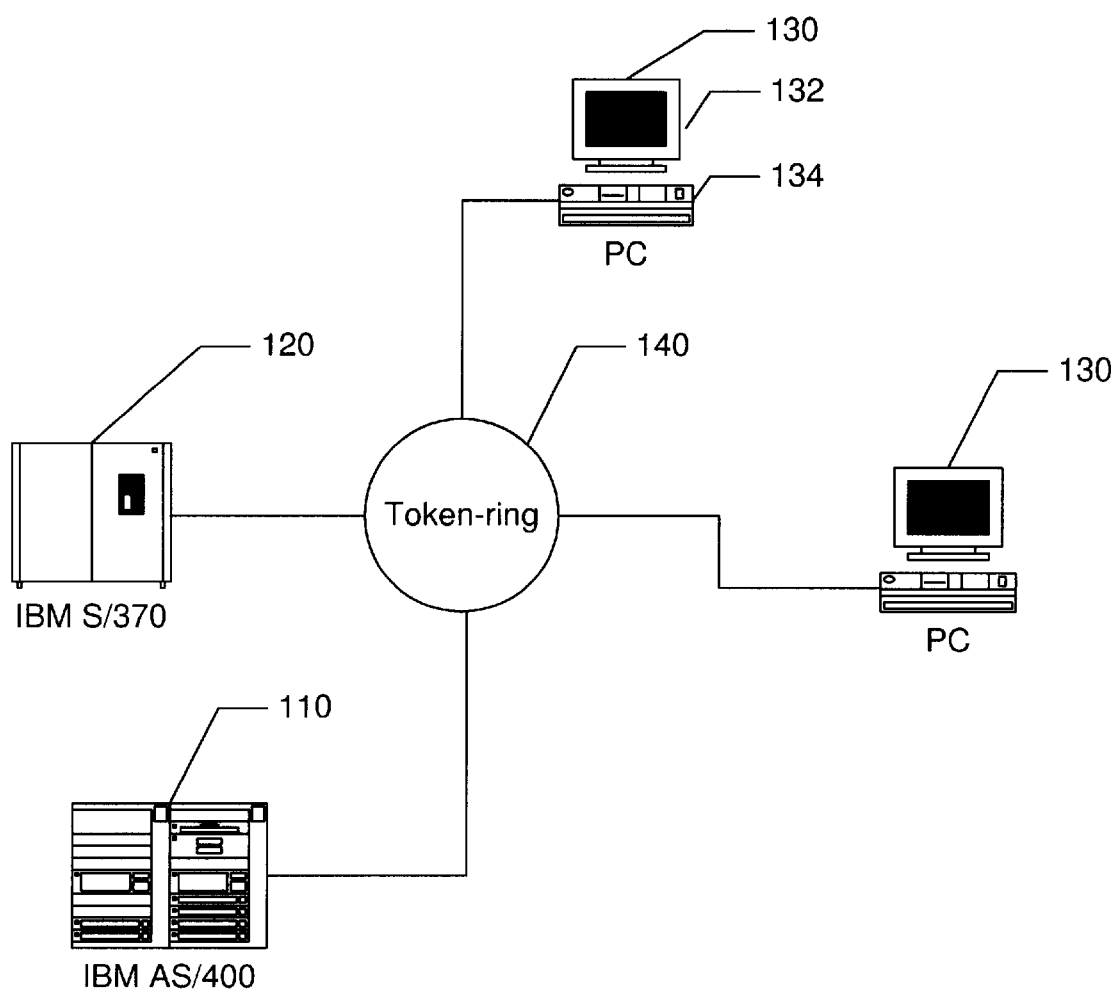
FIG. 1 is a block diagram of a computer system in accordance with the invention.

FIG. 1 shows an IBM AS/400 110, an IBM S/370 120, and two PCs 130 on a token ring network 140. The AS/400 110 is representative of a class of IBM midrange computers which includes the S/36 and S/38. The S/370 120 is representative of a class of IBM mainframe computers which includes the S/390. The IBM midrange and mainframe computers represent a class of products known as IBM hosts and will be so referred as such below. IBM hosts are characterized in that they are multi-user systems, wherein users typically access them through synchronous or bi-synchronous terminals. The terminals are typically dumb, in that they typically have little processing capability, such as the CUTs described above.

Terminals typically comprise a monitor for providing host display session output displays to the user, and an input device such as a keyboard for receiving user input. Thus, programs running on an IBM host which would interact with a user typically display data on the display of the user's terminal and receive input from the user through the terminal's keyboard.

The PCs 130 are preferably Intel-based personal computers using the Microsoft Windows 95 operating system, although other types of computers and operating systems are within the scope of the invention. The PCs 130 are representative of a class of computers which will be referred to herein as "guest computers." The guest computers are characterized in that they have the ability to access the IBM hosts through a special hardware interface and software interface, the software interface for emulating a dumb terminal typically comprising terminal emulation software. To the IBM host, the guest computers appear to be CUTs.

An important feature of the guest computers is that they receive display sessions from the IBM host, but rather than automatically displaying them, the guest computers receive the displays in a "host display session presentation space." With typical terminal emulation systems on PCs 130, the host display session presentation space is displayed directly to the monitor 132. However, because of the additional processing capabilities of the guest computer over a dumb terminal, the terminal emulation program can affect other results.

The PCs 130 preferably have a monitor 132 on which displays are presented to a user, and a central processing unit 134 which stores the programs and processes them. The PCs 130 include user input devices such as a keyboard (not shown) and a mouse (not shown). Other input and output devices are within the scope of the invention.

The Method of Creating the Navigation Path Objects

Figure 2A:
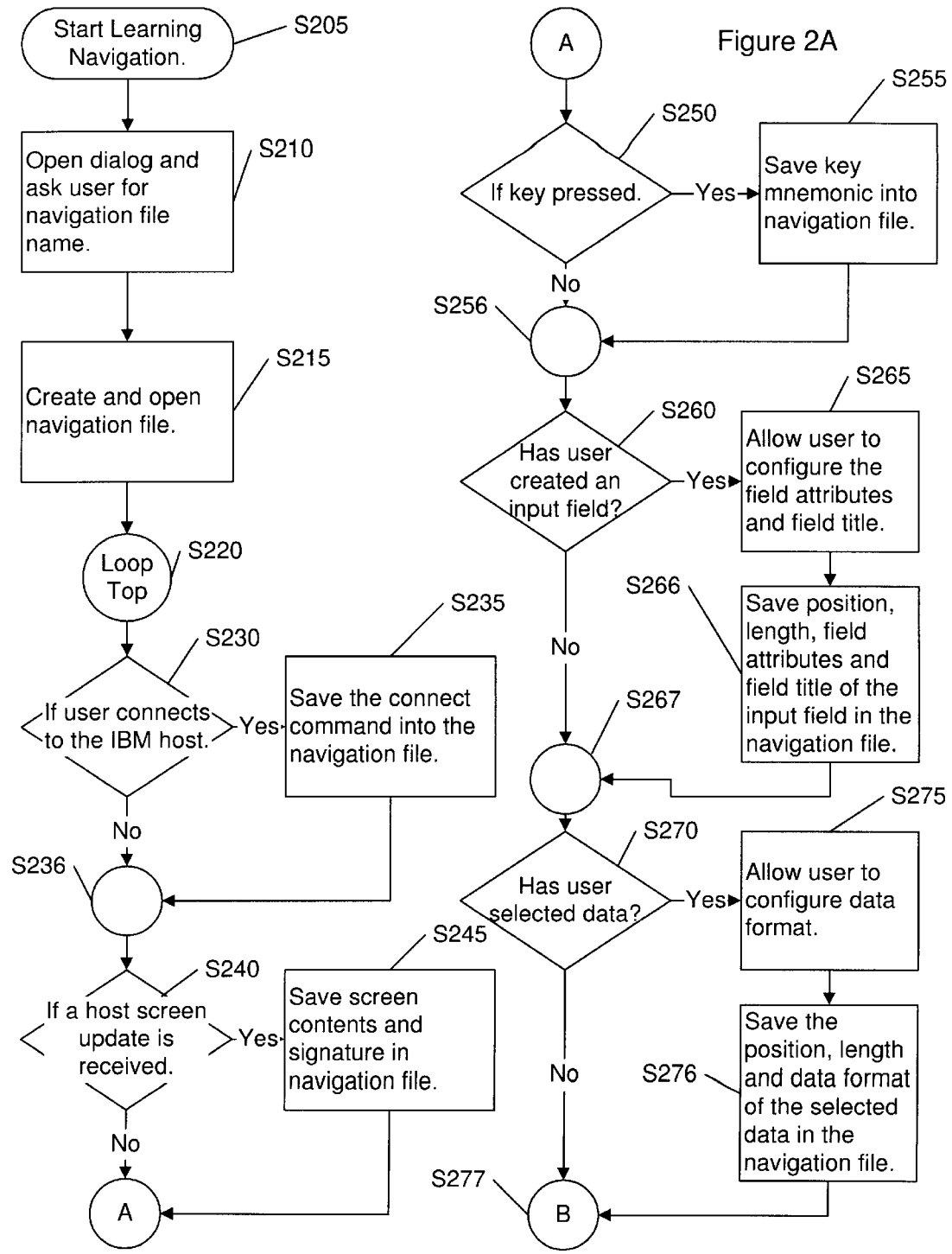
FIGS. 2A and 2B are a flow chart of a process for creating a navigation path object.
Figure 2B:
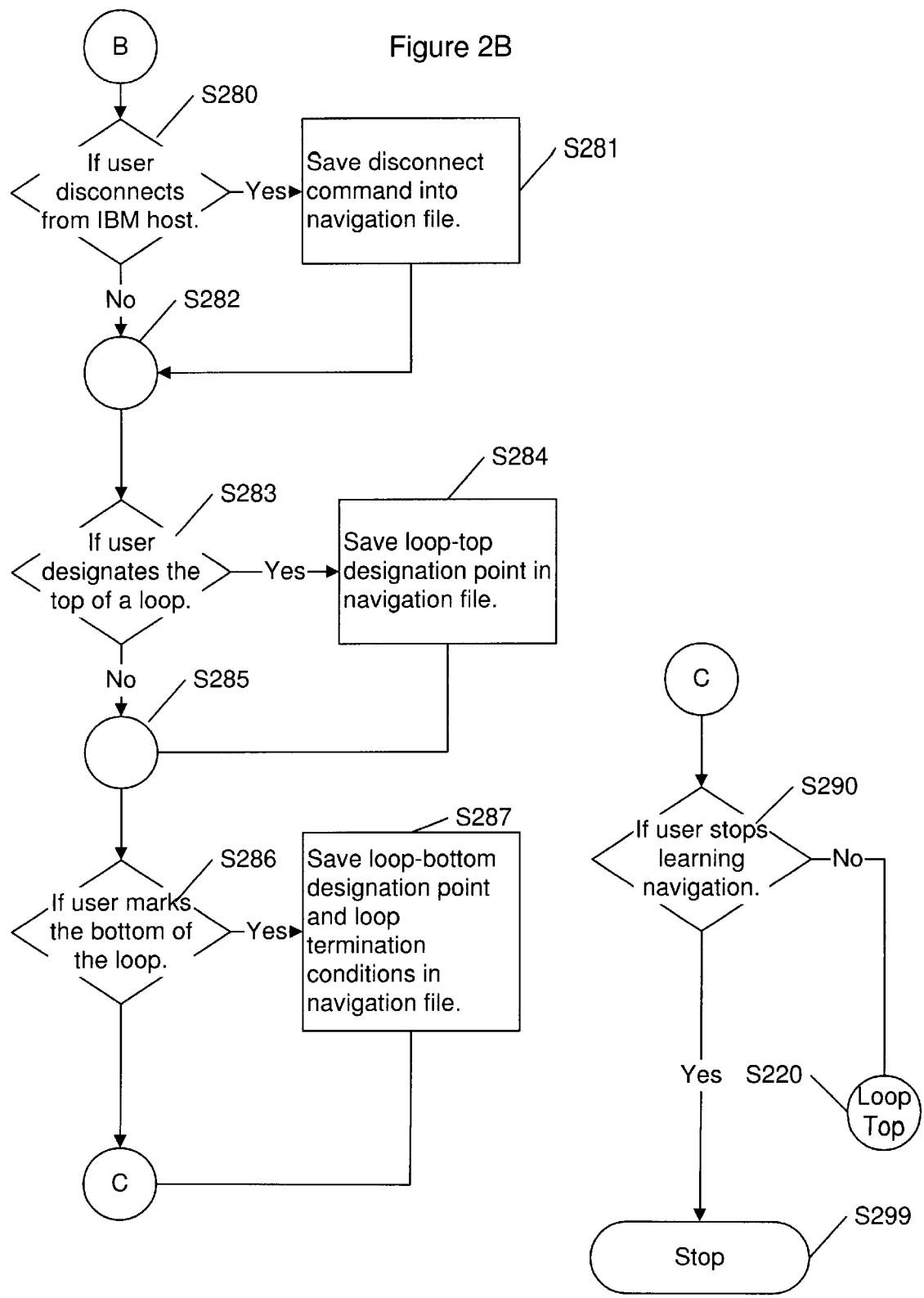
Figure 3A:
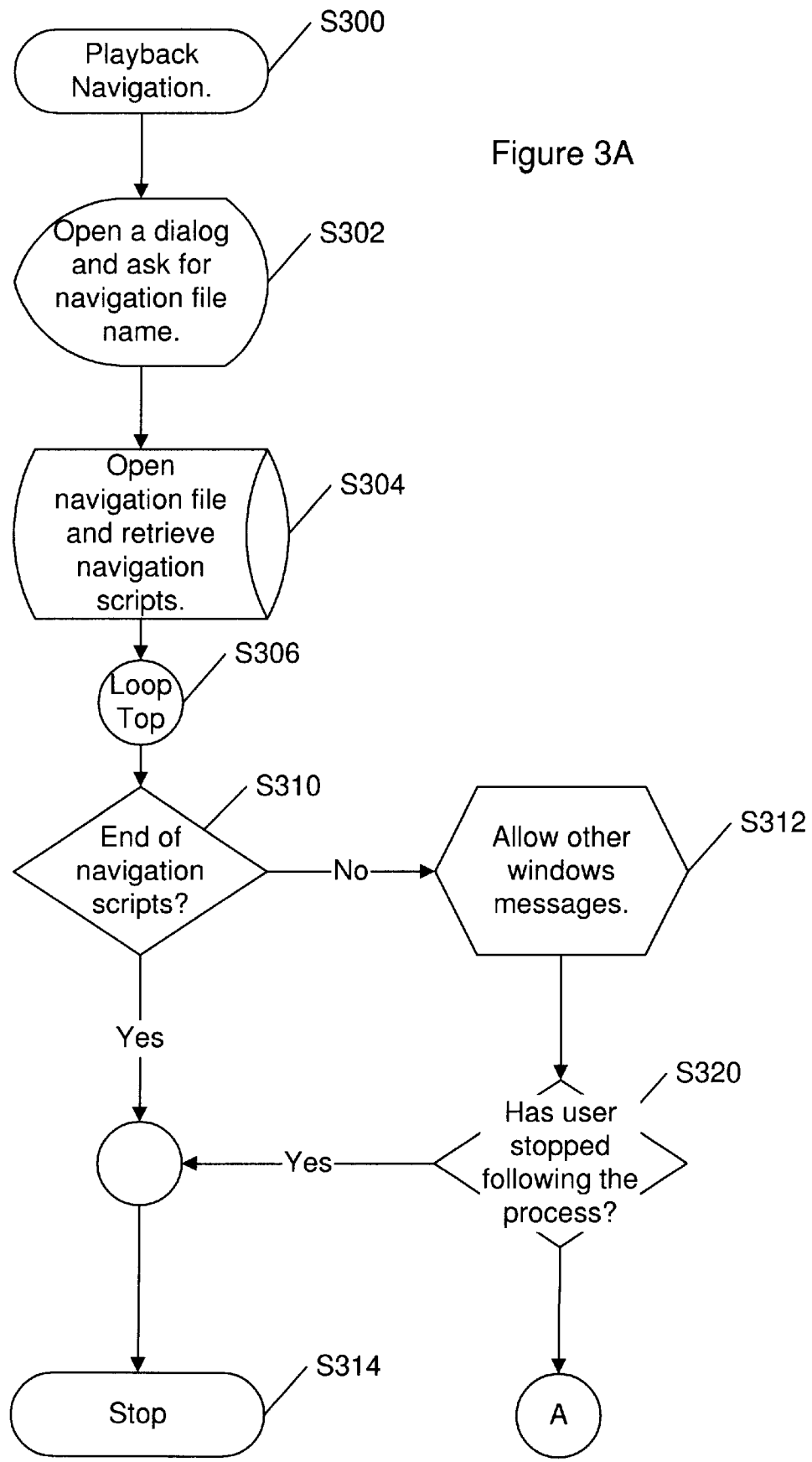
FIGS. 3A, 3B, 3C and 3D are a flow chart of a process for playing back a navigation path object.
Figure 3B:
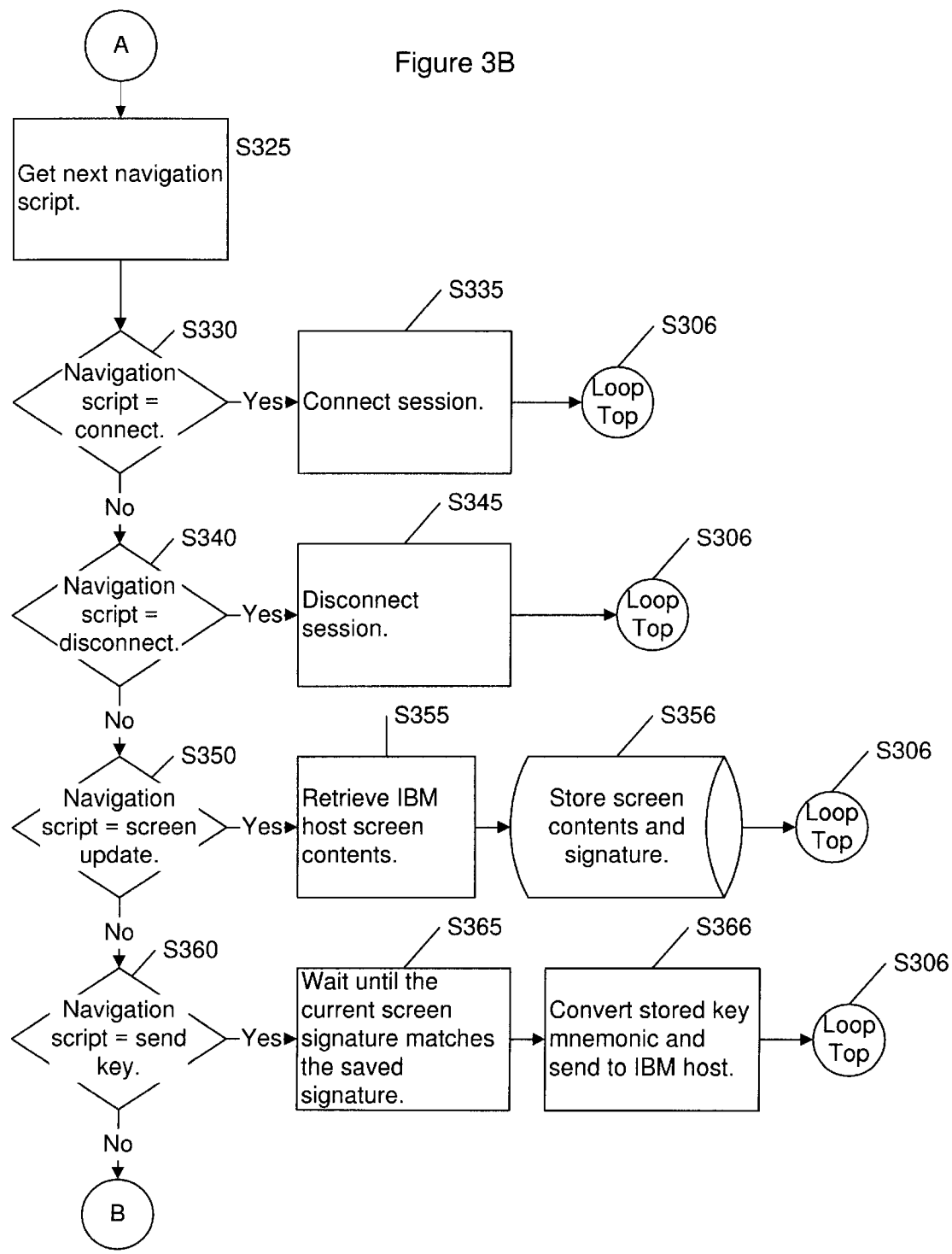
Figure 3C:
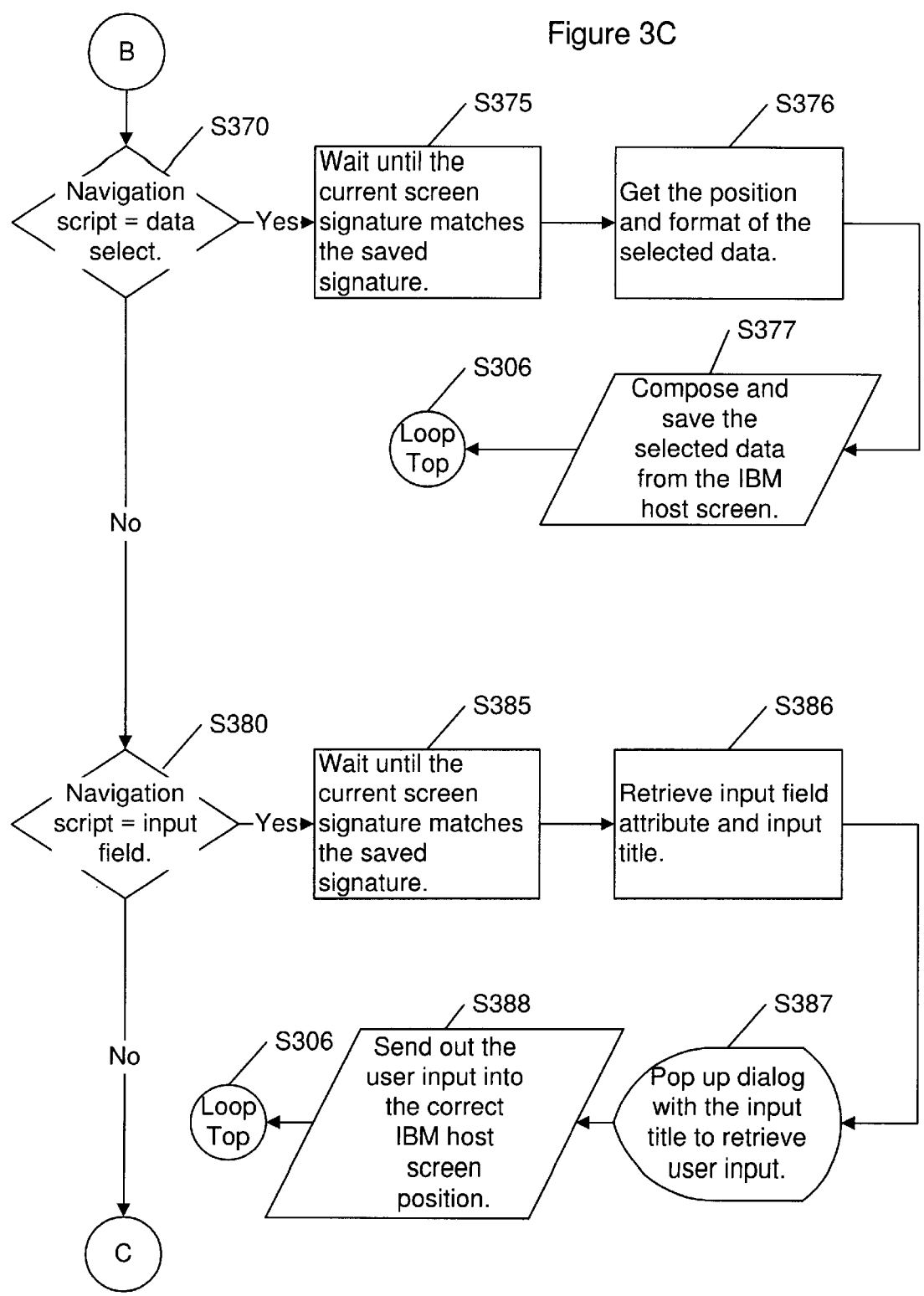
Figure 3D:
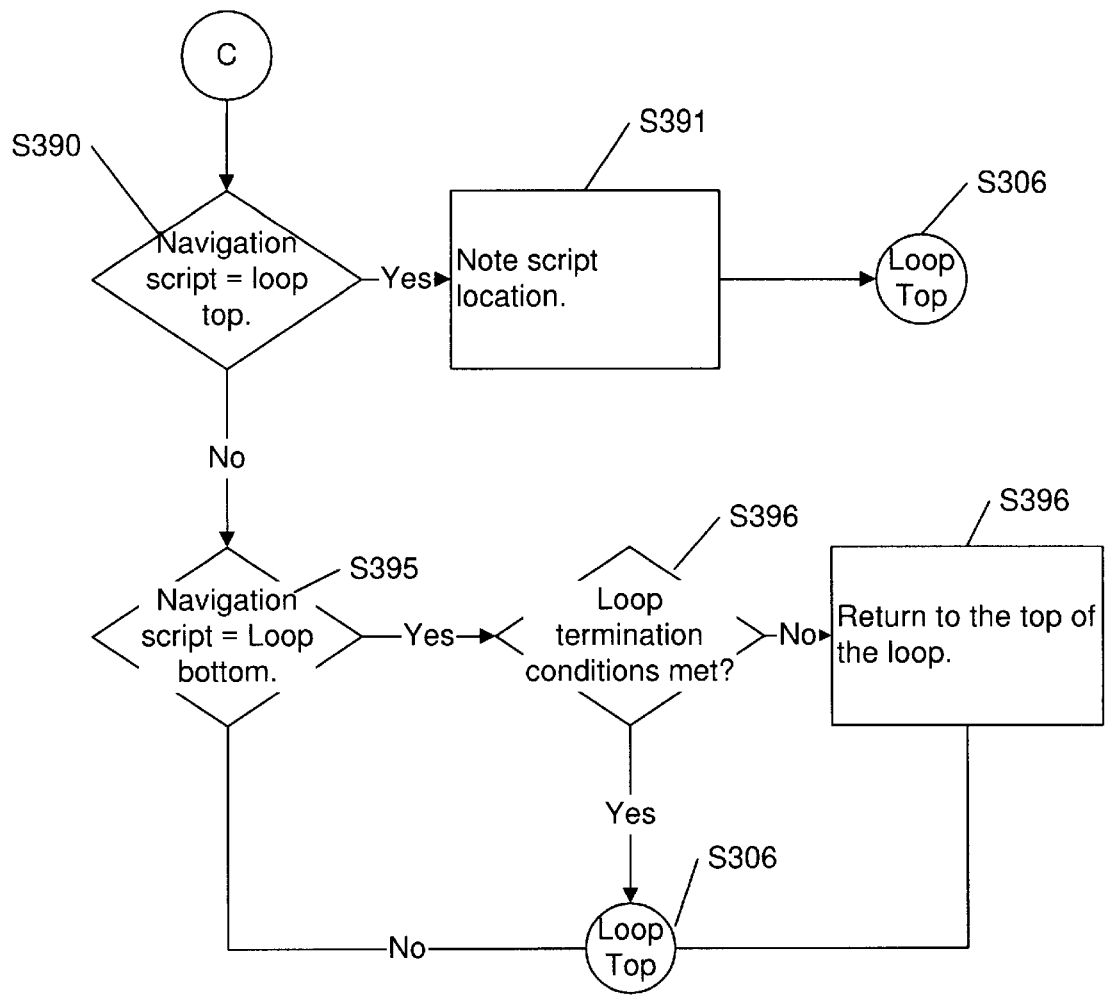

Referring now to FIGS. 2A and 2B, a first major aspect of the invention is described. This aspect relates to the creation of a navigation path object as a navigation file by an administrator. This aspect is preferably embodied as a program stored in the PC 130 and run as desired on the PC 130. This aspect of the invention may also be appreciated from the pseudo code for this program in Appendix A.

Figure 4:
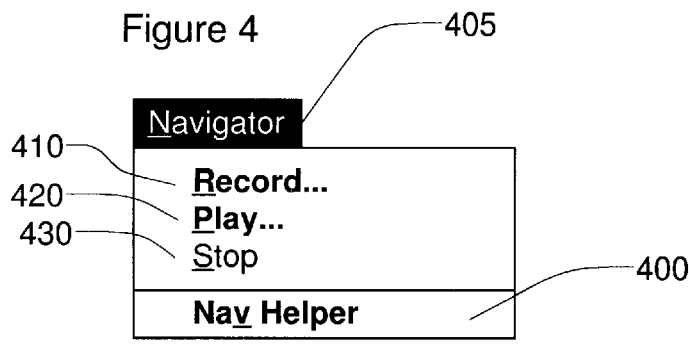
FIG. 4 is a pull-down menu in accordance with the preferred embodiment.

In step S205, the process begins. For example, this may be from the administrator activating a "Navigator" pull-down 405 for a menu 400 as shown in FIG. 4 and selecting a "Record" menu item 410.

Figure 5:
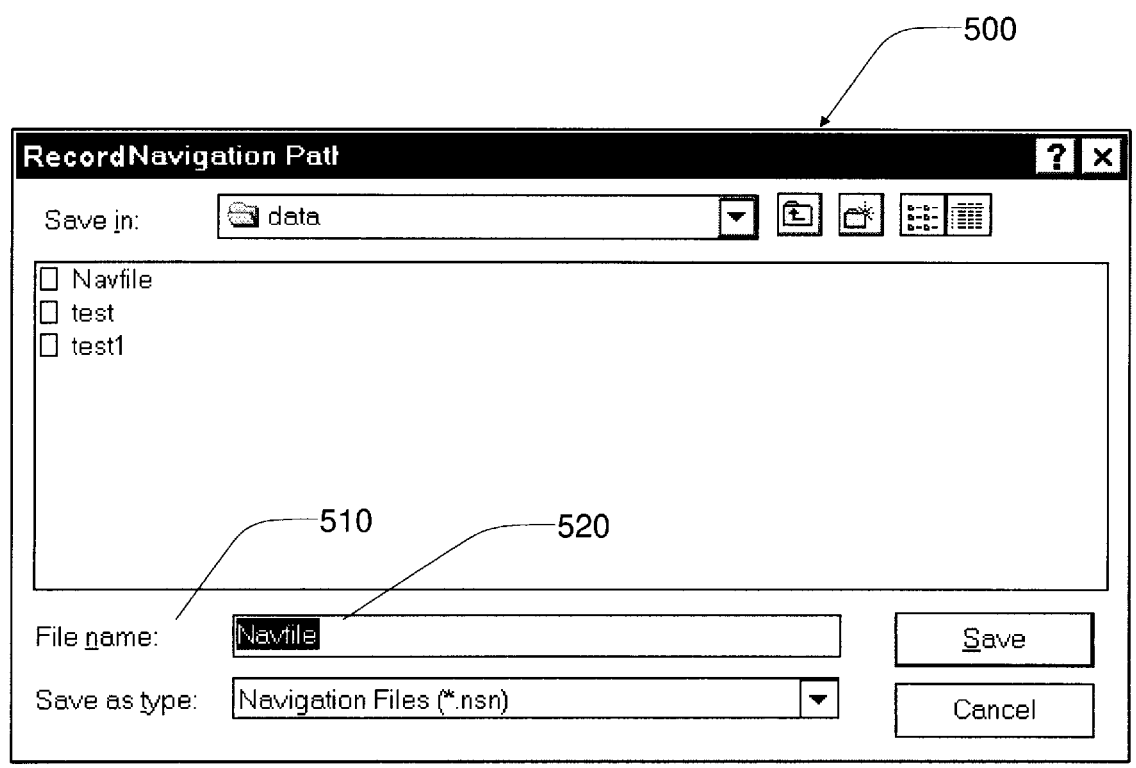
FIG. 5 is a dialog in accordance with the preferred embodiment.

Preferably, there is a step S210 wherein the program causes a Windows dialog 500 to be displayed on the monitor 132 as shown in FIG. 5. This is generally referred to as "opening a dialog." The dialog 500 includes a prompt 510 for the user to enter a name to be used for the navigation file, and an input field 520 for the name. Other elements of the dialog 500 will be appreciated by those of skill in the art and are therefore not described further here.

The navigation file will store a number of scripts recorded during the administrator's interaction with the IBM host. Preferably, each action by the administrator or the IBM host generates a sequence of instructions comprising a script for that action. Each instruction preferably includes a command selected from a predefined command set, and variable data.

The navigation file may be stored in the PC 130 or in another location such as in a file server, as known in the art. Once the administrator has selected a name for the navigation file, the program in step S215 creates and opens the navigation file.

Figure 6:
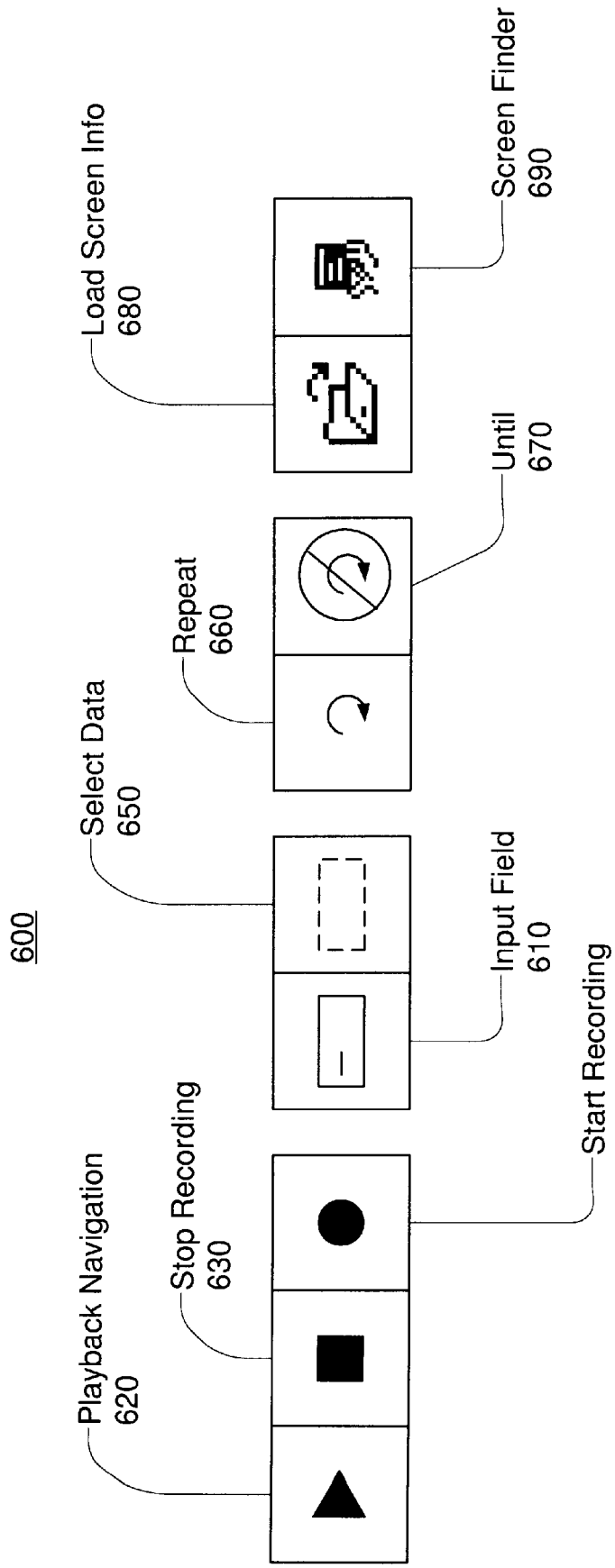
FIG. 6 is a tool bar in accordance with the preferred embodiment.

Once recording begins, the administrator is preferably presented with a standard terminal emulation window 700 on the PC's monitor 132. However, there is preferably also a tool bar 600 as shown in FIG. 6. Note also that the terminal emulation window 70 includes the "Navigator" pull-down 405 of FIG. 4.

The tool bar 600 includes a number of buttons 610, 620, 630, 640, 650, 660, 670, 680, 690. The start recording button 640 functions the same as the Record menu item 410 on the pull down menu 400 (FIG. 4). The remaining buttons will be described with respect to the relevant commands, although their function may be appreciated from the figure by those skilled in the art.

Figure 7:
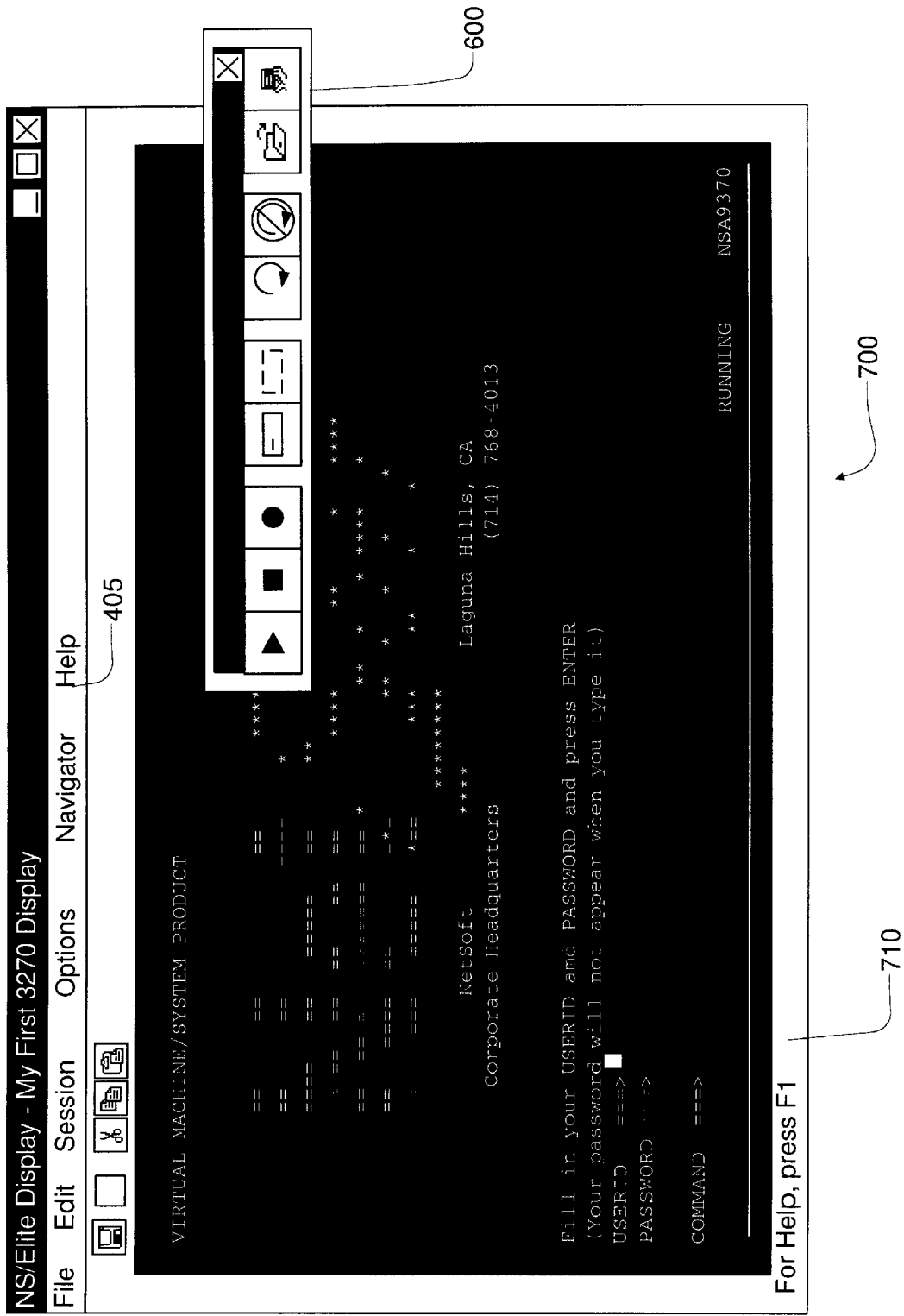
FIG. 7 is a screen shot of a terminal emulator screen in accordance with the preferred embodiment.

The center of the terminal emulation screen 700 is the terminal display area 710 (or terminal screen) which reproduces the host display session presentation space. Other elements of FIG. 7 will be familiar to or readily understood by those skilled in the art.

One event S230 is the administrator causing the PC 130 to be connected to the IBM host. This event essentially comprises the actions necessary for the administrator to start an IBM host session. When this is recognized, then in step S235 the program saves the sequence of commands used to connect to the IBM host into the navigation file as a "connect" script. The connect script preferably includes instructions for using typical terminal emulator functions to open the session. After this, processing continues at step S236.

Another event S240 is where the terminal emulator receives a screen update from the IBM host. This update may be a new screen or a revision of the next previously received screen. When this occurs, in step S245, the program preferably causes the screen's signature to be saved in the navigation file as a "screen update" script. A screen signature comprises a simple means for identifying particular screens. More preferably, the screen signature includes one or more unique and protected fields from the screen, their positions and lengths. After step S245, processing continues at step S246.

Another event S250 is where the administrator presses a key on the PC's keyboard. Such an event may happen, for example, as the administrator starts an application on the IBM host and navigates through the application's menus. The program preferably in step S255 stores an identification of the key in a "key-press" script in the navigation file. This key identifier is preferably a mnemonic of the key, as will be appreciated by those skilled in the art. After step S255, processing continues at step S256.

Another event S260 is where the administrator creates an input field. In other words, and with reference to FIG. 8, the administrator identifies a specific place 820 on the terminal display 710 which is an editable field and for which, during playback, the playback user will need to enter data. One of the tools 610 on the tool bar 600 is preferably designated for allowing the user to mark input fields. The administrator uses the mouse to click on the tool 610, then uses the mouse to click and drag an input box 825 on the terminal emulation window 700.

Figure 8:
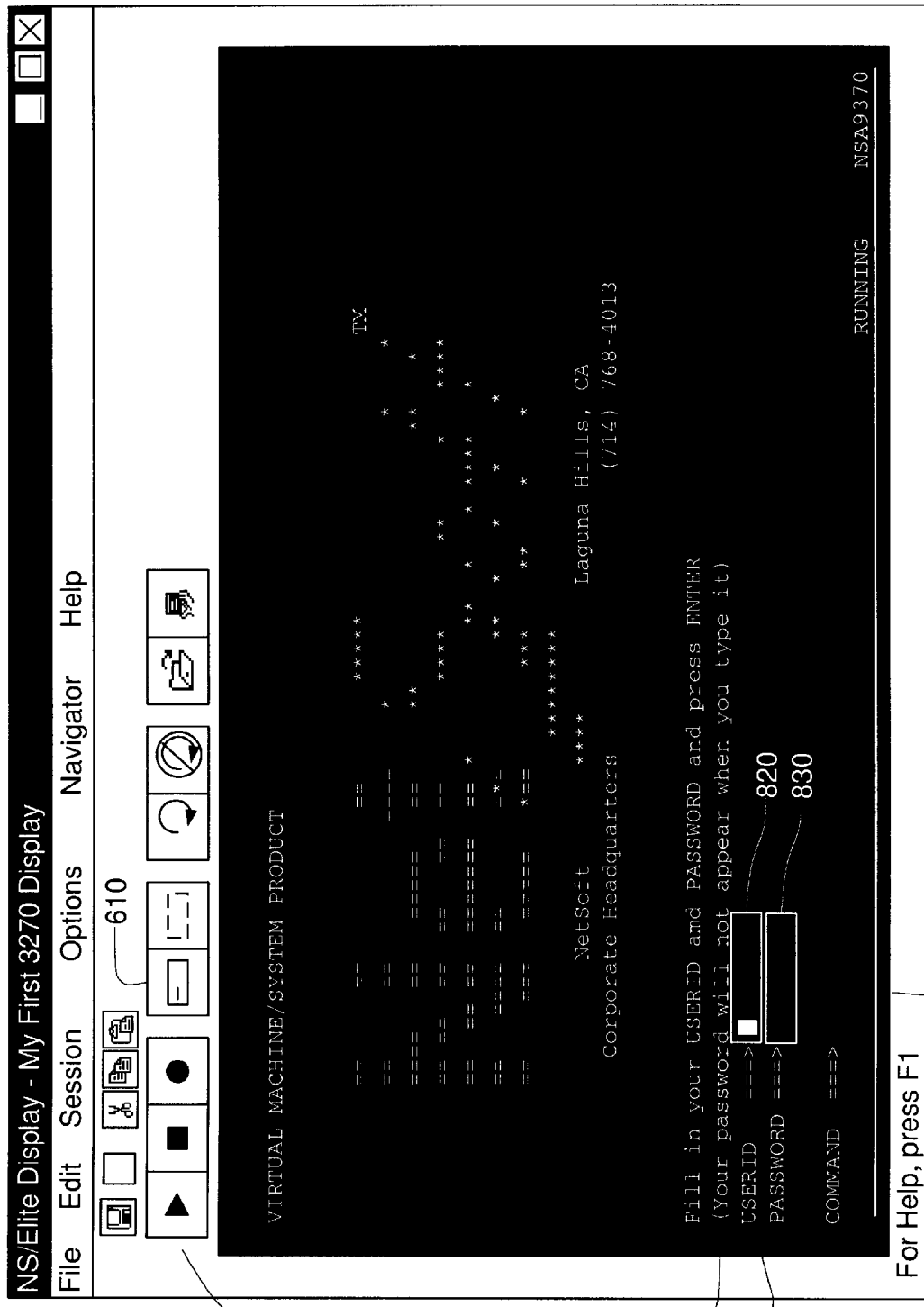
FIG. 8 is a terminal emulator window with a user input field in accordance with the preferred embodiment.

As shown in FIG. 8, the USERID field 825 and a PASSWORD field 835 have been marked with boxes by the administrator. When the script is run by during playback, the user will be prompted to enter his user ID and password for the IBM host. After entry by the user, the playback program will send the user ID and password to the IBM host.

Figure 9:
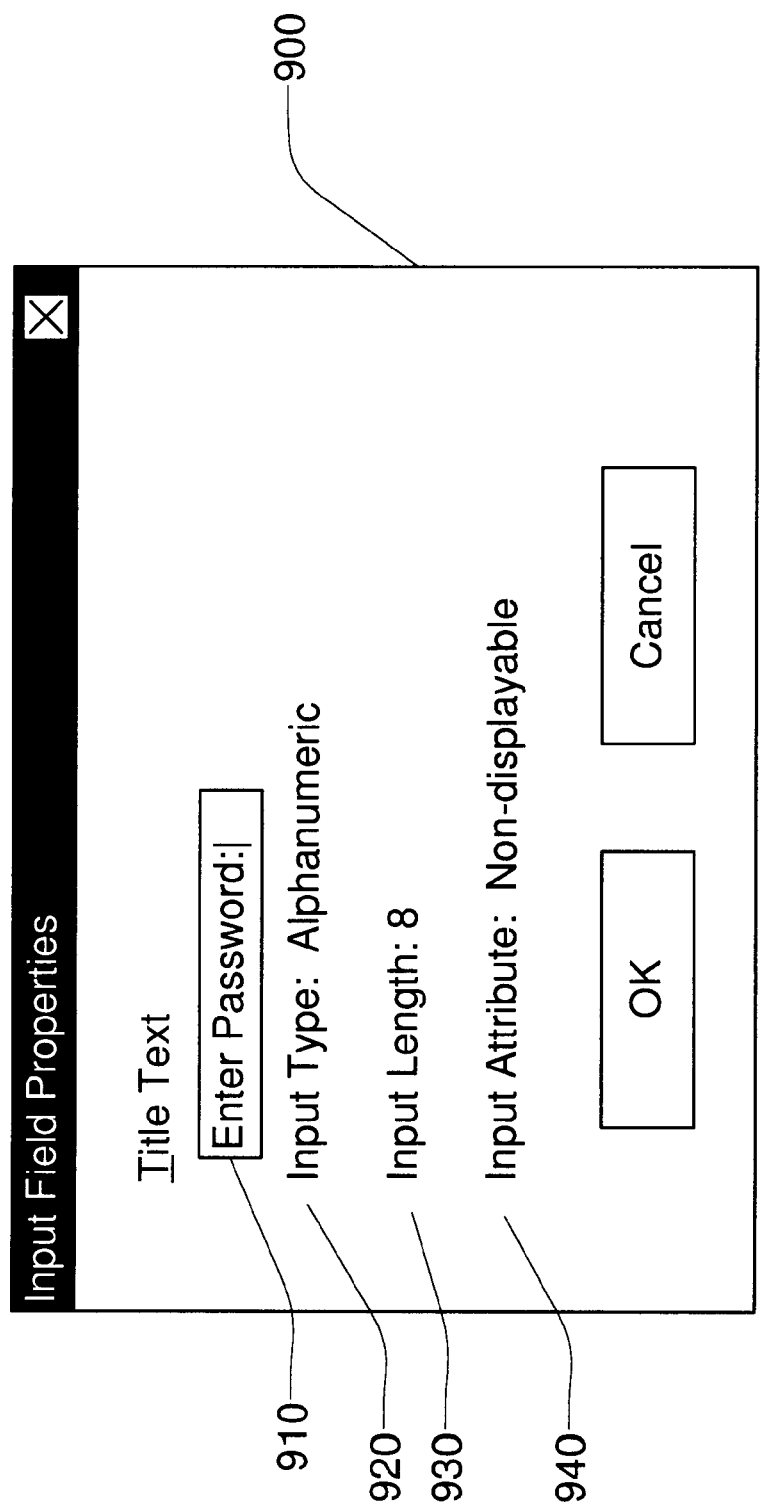
FIG. 9 is a dialog for setting input field properties in accordance with the preferred embodiment.

Referring again to the recording process, after marking a field 825, the program preferably displays a dialog 900 as shown in FIG. 9 (step S265). This dialog 900 allows the user to enter a title 910 for the marked input field 820, as well as displays the type 920, length 930 and attributes 940 of the input field. In step S266, the title 910, type 920, length 930 and attributes 940, plus the position of the field in the terminal screen 710, are saved as an "input field" script in the navigation file. The title, type, length and attributes are used during playback to properly prompt the user for an input and insert that input into the previously identified field in the proper format. After step S266, processing continues at step S267.

Figure 10:
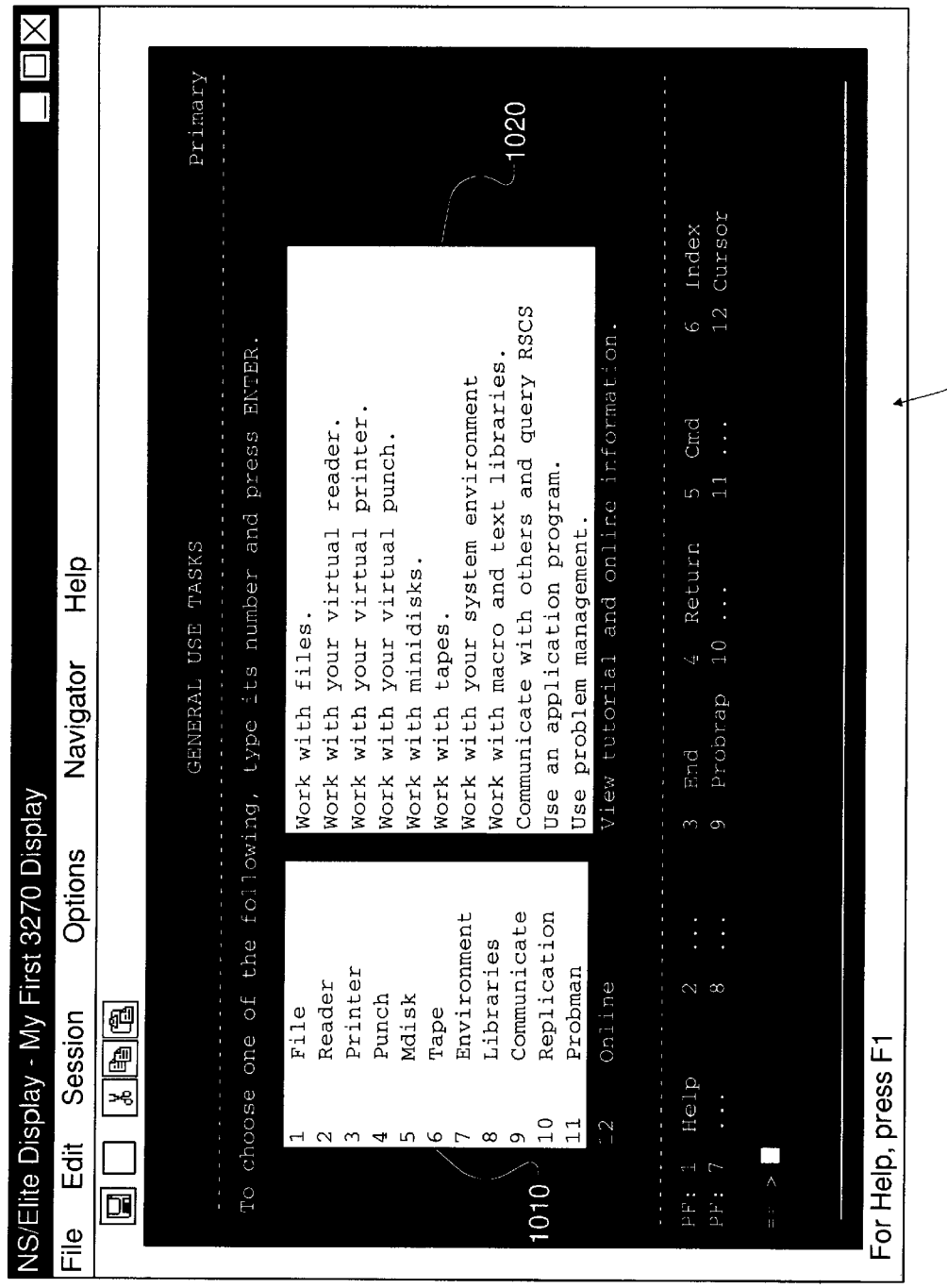
FIG. 10 is a terminal emulator window having data areas marked in accordance with the preferred embodiment.

Another event S270 is where the user selects an area 1010 of the terminal screen 710 like the one shown in FIG. 10 which, during playback will have data which will be imported to the PC 130. This is useful for importing data from the IBM host to an OLE container application.

Preferably, the administrator may mark one 1010 or more 1020 rectangular areas of the terminal screen 710 for data selection. One of the tools 650 on the tool bar 600 is preferably designated for allowing the user to mark data areas. The administrator uses the mouse to click on the tool 650, then uses the mouse to click and drag the boxes 1010, 1020 on the terminal screen 710. Preferably, these multiple areas 1010, 1020 are combinable by the program so that, during playback, they can form a table. This is especially desirable where a large table is needed which spans across multiple host panels.

Figure 11:
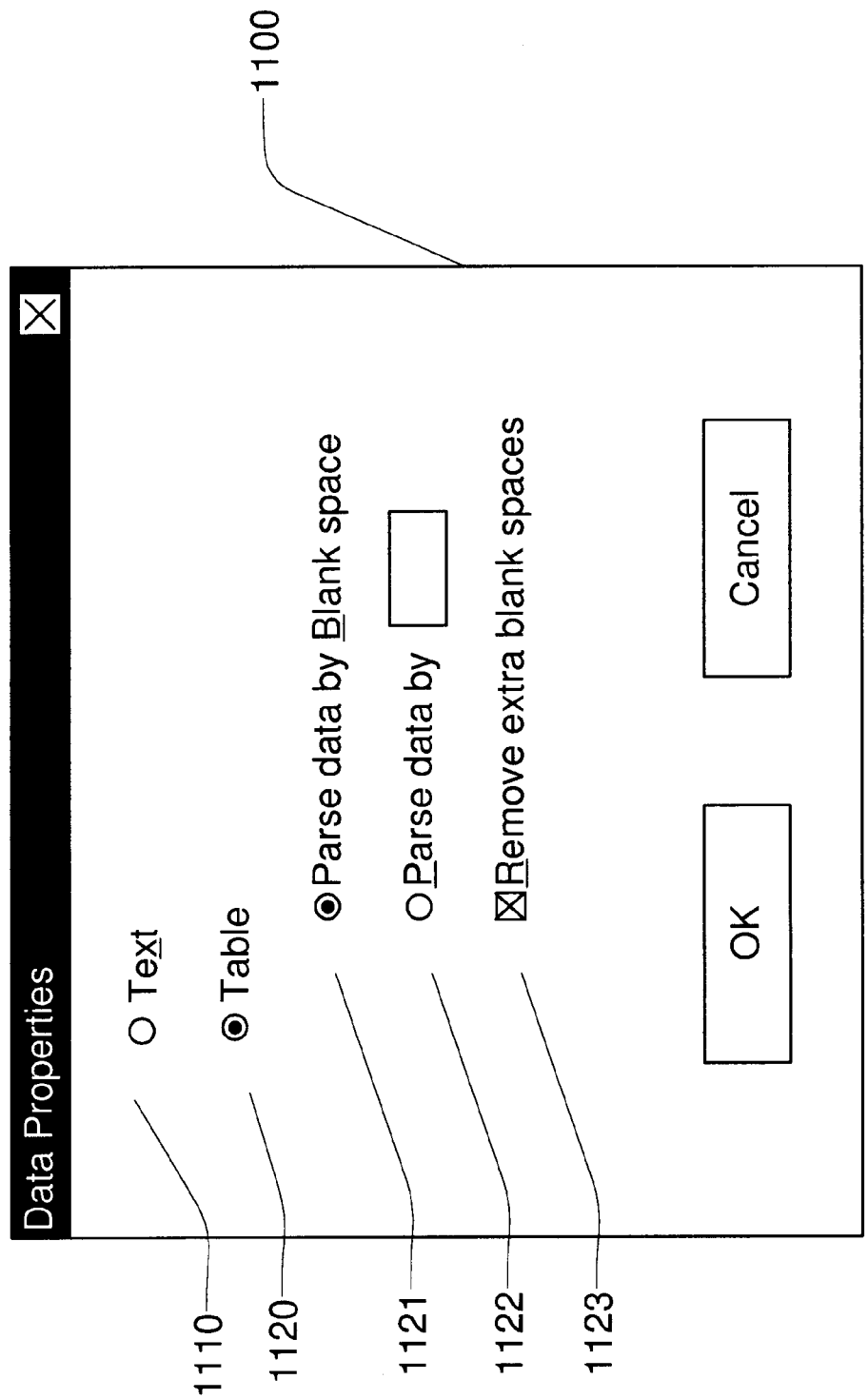
FIG. 11 is a dialog for setting data properties in accordance with the preferred embodiment.

After the areas are marked S270, the program displays a Data Properties dialog 1100 as shown in FIG. 11 (step S275). Using this dialog 1100, the administrator may select whether the marked areas 1010, 1020 should be transferred as text 1110 or as a table 1120. Furthermore, if a table 1120, then the administrator may select whether the data should be parsed by blank space 1121 or by a special character 1122, and whether extra blank spaces should be removed 1123.

After the data import areas have been marked and configured (S275), the program saves the position, length and data format of the marked areas as a script in the navigation file as a "data import" script (step S276). After step S276, processing continues at step S277.

Another event (S280) is when the administrator causes the terminal emulator to disconnect from the IBM host. In this event, the program saves the disconnect command as a "disconnect" script in the navigation file (step S281). After step S281, processing continues at step S282.

Two other events correspond to buttons on the tool bar 600—a repeat tool 660 and an until tool 670. These tools 660, 670 are used to create loops in the navigation file. The repeat tool 660 is selected (step S283) where the top of the loop is desired and creates a "loop top" script (step S284). The until tool 670 is selected (step S286) where the bottom of the loop is desired and creates a "loop bottom" script (step S287). Preferably, when the administrator clicks on the until tool 670, the program displays a dialog for the administrator to enter termination conditions for the loop.

The repeat and until tools 660, 670 enable smart page-down actions until the end of a document or database is reached. The loop top ad loop bottom scripts may be combined with the data import script to retrieve an unknown amount of data from a document or database.

The last event is the administrator stopping recording (step S290). To do so, the program preferably includes, on the pull down menu 400 (FIG. 4) a "stop" item 430. Preferably, this item 430 is greyed until recording starts. One of the tools 630 on the tool bar 600 is preferably designated for allowing the user to stop recording. The administrator uses the mouse to click on the tool 630. If the administrator selects the stop item 430 or the stop tool 630, then the navigation file is closed and processing ends. Otherwise, processing continues at the top of the recording loop (step S220).

Once the scripts are recorded, preferably there is provided a means for editing the scripts. More preferably, there is provided a means for graphically displaying the scripts, for example in sequence.

The Method of Using the Navigation Path Objects

Referring now to FIGS. 3A, 3B, 3C and 3D, another major aspect of the invention is described. This aspects relates to the playback of the navigation file by a user and is preferably embodied as a program stored in the PC 130 and run as desired on the PC 130. This aspect of the invention may also be appreciated from the pseudo code for this program in Appendix B.

In step S300, the process begins. For example, this may be from the user activating the pull-down menu 400 of FIG. 4 and selecting "Play" 420. Alternatively, the user might click on the playback tool 620 (FIG. 6). Preferably, there is a step S302 wherein the program opens a dialog similar to that shown in FIG. 5 for obtaining the name of the navigation file to be played. Then the program opens the navigation file and retrieves the navigation scripts (step S304).

Alternatively, the navigation file may be played by running it from the Windows 95 Explorer or from the Windows 95 desktop. As another alternative, the navigation file could be started and played via an OLE link. As a further alternative, the program could include a means for graphically displaying the screens stored in the selected navigation file, and for allowing the user to select a particular screen as a target. If the target screen is not the last, then the program would stop script processing when the target screen is reached.

A connector S306 is shown which is the top of the program's loop for sequential playback of scripts. This process generally involves testing the current status of playback, reading the next script, identifying the type of script, replaying the command sequences of the script, and returning to the top of the loop.

At the top of the loop (step S306), the program determines whether it has reached the end of the navigation scripts (steps S310). If so, then processing is complete and the program stops (step S314). Otherwise, the program processes messages from the program's windows and from other applications to avoid "freezing" of the program's user interface during playback (step S312).

Next, before processing a script, the program determines whether the user has stopped the navigation process (step S320). This may be because the user clicked on the stop tool 630 (FIG. 6) or selected "Stop" 430 from the pull-down menu 400 (FIG. 4). If so, then processing stops (step S314). Otherwise, the program loads the next navigation script (step S325) for processing.

If the navigation script is a connect script (step S330), then the program uses the command sequences of the connect script to connect to the IBM host (step S335). Then processing returns to the top of the script processing loop (step S306).

If the navigation script is a disconnect script (step S340), then the program uses the command sequences of the disconnect script to disconnect from the IBM host (step S345). Then processing returns to the top of the script processing loop (step S306).

If the navigation script is a screen update script (step S350), then the program retrieves the saved IBM host screen contents (step S355) and stores the signature as the saved signature (step S356). Then processing returns to the top of the script processing loop (step S306).

If the navigation script is a key-press script (step S360), then the program preferably waits until the current screen signature matches the saved signature in the script (step S365), then converts the stored key mnemonic and sends the key to the IBM host (step S666). Then processing returns to the top of the script processing loop (step S306).

If the navigation script is a data import script (step S370), then the program preferably waits until the current screen signature matches the saved signature in the script (step S375). Then, the program gets the position and format of the selected data from the script (step 376), and composes and saves the selected data from the IBM host screen (step S377) as specified in the script. Then processing returns to the top of the script processing loop (step S306).

If the navigation script is an input field script (step S380), then the program preferably waits until the current screen signature matches the saved signature in the script (step S375). Then, the program gets the input field attribute and field title from the script (step S386), opens a dialog with the input title to retrieve the user's desired input (step S387), and sends out the user input to the IBM host into the screen position defined in the script (step S388).

If the navigation script is a loop top script (step S290), then the program notes the location of the script and continues (step S391). Once the loop bottom script is met (step S395), the program tests whether the loop termination conditions of the loop bottom script are met (step S396). If so, then the next script is processed (step S306). Otherwise, the program returns to the corresponding loop top script (step S396).

If the script is not identified, then it is ignored and processing returns to the top of the script processing loop (step S306).

Although exemplary embodiments of the present invention have been shown and described, it will be apparent to those having ordinary skill in the art that a number of changes, modifications, or alterations to the invention as described herein may be made, none of which depart from the spirit of the present invention. All such changes, modifications and alterations should therefore be seen as within the scope of the present invention.

APPENDIX A

Learning (Record) navigation:

```
if starts learning navigation,
    opens a dialog and asks user for navigation filename
    (.NSN filename).
    creates and opens this file.
    while not quit,
    {
        if connects host,
            saves connect command into navigation file.
        if receives host screen update,
            analyzes screen content for unique signature:
                (signature analysis:)
                if is unformatted host screen,
                    if is not a blank screen,
                        gets the first 20 characters as signature.
                    else
                        use NULL as signature.
                else
                    for the first, second, and the second last
                        protected fields, strips out leading repeat
                        characters.
                        filters out date and time digits.
                        saves the position and length of this protected
                        field as signature field.
                    saves screen contents, position and length of
                    signature fields into navigation file.
        if key pressed,
            saves key mnemonic into navigation file.
        if creates an input field,
            allows user to configure field attributes and field
            title through short-cut menu.
            saves position, length, field attributes and field title of
            input field into navigation file.
        if selects data,
            allows user to configure data format through
            short-cut menu.
            saves position, length and data format of selected data
            into navigation file.
        if disconnects host,
            saves disconnect command into navigation file.
        if stops learning navigation,
            saves and closes navigation file.
            quit.
    }
```

APPENDIX B

Following (Playback) navigation:

```
if starts following navigation,
    opens a dialog, asks for navigation filename.
    opens this navigation file and retrieve navigation scripts.
    while not end of navigation scripts,
    {
        allows other windows messages flow.
        if user stops following process,
            quit.
        gets next navigation script.
        if navigation script = connect,
            connects session.
        else if navigation script = disconnect,
            disconnects session.
        else if navigation script = host screen update,
            retrieves screen contents, position and length of signature
            fields.
```

APPENDIX B-continued

Following (Playback) navigation:

```
            composes and concatenates signature fields as the saved
            signature.
        else if navigation script = send key,
            waits till current screen signature is the same as the saved
            signature.
            converts key mnemonic and sends it to the host.
        else if navigation script = data select,
            waits till current screen signature is the same as the saved
            signature.
            gets the position and format of selected data.
            composes and saves the selected data from current
            host screen.
        else if navigation script = input field,
            waits till current screen signature is the same as the saved
            signature.
            retrieves input field attribute and input title.
            pops up dialog with input title to retrieve user input.
            sends out user input into correct host screen position.
    }
```

It is claimed:

1. A method of navigating a host computer from a first guest computer, the first guest computer including a first display, a first user input device and a first terminal emulation program, the first terminal emulation program displaying screen displays generated by the host computer and transmitted to the first guest computer as representations on the first display, and the first terminal emulation program transmitting user input from the first user input device to the host computer as keystrokes, the method comprising recording a navigation path object comprising a script during a first user's interaction with the host computer using the first terminal emulation program and comprising the steps of:

(a) the first user activating a function on the first guest computer for creating an input field command in the script, (b) the first user marking on the representation of the host computer screen on the first guest computer's display an input field whereat data will be entered during script playback, (c) the first user using the first user input device to enter into the first guest computer a title of the input field for use as a prompt during script playback, (d) the first guest computer determining a position and a length of the input field as marked by the first user on the representation of the host computer screen, and (e) the first guest computer saving the input field command including the position, the length and the title of the input field in the navigation path object.

2. A method of navigating a host computer as set forth in claim 1, wherein during a second user's interaction with the host computer using a second terminal emulation program on a second guest computer, the second guest computer including a memory, a second display and a second user input device, the second terminal emulation program receiving screen displays generated by the host computer and transmitted to the second guest computer as logical representations in the second guest computer's memory, replaying the script in the navigation path object through steps comprising, if the script contains an input field command:

(a) the second guest computer retrieving the position, the length and the title from the input field command, (b) the second guest computer displaying on the second display the title to prompt the second user to input data, (c) the second user using the second user input device to enter an input corresponding to the title, the second guest computer limiting the input to the length specified in the input field command, and (d) the second guest computer transmitting the second user's limited input into the host computer screen at the position in the data input command as keystrokes corresponding to the input.

3. A computer program product comprising a computer usable medium having computer readable program code embodied therein for navigating a host computer, the computer program product for use by a first guest computer comprising a memory, a first display, a first user input device and a first terminal emulation program, the first terminal emulation program receiving screen displays generated by the host computer and transmitted to the first guest computer as logical representations in the first guest computer's memory, the computer readable program code in the computer program product comprising computer readable program code for causing the first guest computer to, during a first user's interaction with the host computer using the first terminal emulation program:

(a) read a navigation path object comprising at least one script including an input field command, (b) retrieve a position, a length and a title from the input field command, (c) display the title on the first display to prompt the first user to input data, (d) receive an input entered by the first user corresponding to the title using the first user input device, (e) limit the input to the length specified in the input field command, and (f) transmit the limited input into the host computer screen at the position in the data input command as keystrokes corresponding to the input.

4. A computer program product comprising a computer usable medium having computer readable program code embodied therein for navigating a host computer as set forth in claim 3, the computer program product further for use by a second guest computer comprising a second display, a second user input device and a second terminal emulation program, the second terminal emulation program displaying screen displays generated by the host computer and transmitted to the second guest computer as representations on the second display, and the second terminal emulation program capable of transmitting user input from the second user input device to the host computer as keystrokes, the computer readable program code in the computer program product further comprising computer readable program code for causing the second guest computer to, during a second user's interaction with the host computer using the second terminal emulation program prior to the first user's interaction:

(a) create and open the navigation path object, (b) detect activation by the second user of a function on the second guest computer for creating the input field command in the navigation path object, (c) enable the second user to mark on the representation of the host computer screen on the second guest computer's display an input field whereat data will be entered during playback, (d) receive from the second user the entry of the title using the second user input device for use as a prompt during playback, (e) determine the position and the length of the input field as marked by the second user on the representation of the host computer screen, and (f) save the input field command including the position, the length and the title of the input field in the navigation path object.

5. A program storage device readable by a machine, tangibly embodying a program of instructions executable by the machine to perform method steps for navigating a host computer, the program for use by a first guest computer comprising a memory, a first display, a first user input device and a first terminal emulation program, the first terminal emulation program receiving screen displays generated by the host computer and transmitted to the guest computer as logical representations in the guest computer's memory, the method steps comprising, during a first user's interaction with the host computer using the first terminal emulation program:

(a) reading a navigation path object comprising at least one script including an input field command, (b) retrieving a position, a length and a title from the input field command, (c) displaying the title to prompt the first user to input data, (d) receiving an input entered by the first user corresponding to the title using the first user input device, (e) limiting the input to the length specified in the input field command, and (f) transmitting the first user's limited input into the host computer screen at the position in the data input command as keystrokes corresponding to the input.

6. A program storage device readable by a machine, tangibly embodying a program of instructions executable by the machine to perform method steps for navigating a host computer as set forth in claim 5, the program further for use by a second guest computer comprising a second display, a second user input device and a second terminal emulation program, the second terminal emulation program displaying screen displays generated by the host computer and transmitted to the guest computer as representations on the second display, and the second terminal emulation program transmitting user input from the second user input device to the host computer as keystrokes, the method steps further comprising, during a second user's interaction with the host computer using the second terminal emulation program prior to the first user's interaction:

(a) creating and opening the navigation path object, (b) detecting activation by the second user of a function on the second guest computer for creating the input field command in the navigation path object, (c) enabling the second user to mark on the representation of the host computer screen on the guest computer's display an input field whereat data will be entered during playback, (d) receiving from the second user through the second user input device the entry of a title of the input field for use as a prompt during playback, (e) determining the position and the length of the input field as marked by the second user on the representation of the host computer screen, and (f) saving the input field command including the position, the length and the title of the input field in the navigation path object.

7. A method of navigating a host computer by a first guest computer, the first guest computer including a first display, a first user input device and a first terminal emulation program, the first terminal emulation program displaying screen displays generated by the host computer and transmitted to the first guest computer as representations on the first display, and the first terminal emulation program transmitting user input from the first user input device to the host computer as keystrokes, the method comprising recording a navigation path object comprising a script during a first user's interaction with the host computer using the first terminal emulation program, and comprising the steps of:

(a) the user activating a function on the guest computer for creating a data retrieve command in the script, (b) the user marking on the representation of the host computer screen on the first guest computer's display an area from which data will be retrieved during script playback, (c) the user entering into the first guest computer using the first user input device a format into which the data retrieved from the host computer screen should be converted during script playback, (d) the first guest computer determining a position and a length of the area on the representation of the host computer screen, and (e) the first guest computer saving a data retrieve command including the position, the length and the format of the data area in the navigation path object.

8. A method of navigating a host computer as set forth in claim 7, wherein during a second user's interaction with the host computer using a second terminal emulation program on a second guest computer, the second guest computer including a memory, a second display and a second user input device, the second terminal emulation program receiving screen displays generated by the host computer and transmitted to the second guest computer as logical representations in the second guest computer's memory, replaying the script in the navigation path object through steps comprising, if the script contains a data retrieve command:

(a) retrieving the position, the length and the format from the data retrieve command, (b) retrieving any data in the representation of the host computer screen in the second guest computer's memory at the position and of the length in the data retrieve command, and (c) converting the retrieved data into the format in the data retrieve command.

9. A computer program product comprising a computer usable medium having computer readable program code embodied therein for navigating a host computer, the computer program product for use by a first guest computer comprising a memory, a first display, a first user input device and a first terminal emulation program, the first terminal emulation program receiving screen displays generated by the host computer and transmitted to the first guest computer as logical representations in the first guest computer's memory, the computer readable program code in the computer program product comprising computer readable program code for causing the first guest computer to, during a first user's interaction with the host computer using the first terminal emulation program:

(a) read a navigation path object comprising at least one script including a data retrieve command, (b) retrieve a position, a length and a format from the data retrieve command, (c) retrieve any data in the representation of the host computer screen in the first guest computer's memory at the position and of the length in the data select command, and (d) convert the retrieved data into the format in the data retrieve command.

10. A computer program product comprising a computer usable medium having computer readable program code embodied therein for navigating a host computer as set forth in claim 9, the computer program product further for use by a second guest computer comprising a second display, a second user input device and a second terminal emulation program, the second terminal emulation program displaying screen displays generated by the host computer and transmitted to the second guest computer as representations on the second display, and the second terminal emulation program capable of transmitting user input from the second user input device to the host computer as keystrokes, the computer readable program code in the computer program product further comprising computer readable program code for causing the second guest computer to, during a second user's interaction with the host computer using the second terminal emulation program prior to the first user's interaction:

(a) create and open the navigation path object, (b) detect activation by the second user of a function on the second guest computer for creating the data select command in the navigation path object, (c) enable the second user to mark on the representation of the host computer screen on the second guest computer's display an area from which data will be retrieved during playback, (d) enable the second user to enter into the second guest computer using the second user input device the format into which the data retrieved from the host computer screen should be converted during playback, (e) determine the position and the length of the area as marked by the second user on the representation of the host computer screen, and (f) save the data retrieve command including the position, the length and the format of the input field in the navigation path object.

11. A program storage device readable by a machine, tangibly embodying a program of instructions executable by the machine to perform method steps for navigating a host computer, the program for use by a first guest computer comprising a memory, a first display, a first user input device and a first terminal emulation program, the first terminal emulation program receiving screen displays generated by the host computer and transmitted to the guest computer as logical representations in the guest computer's memory, the method steps comprising, during a first user's interaction with the host computer using the first terminal emulation program:

(a) reading a navigation path object comprising at least one script including a data retrieve command, (b) retrieving a position, a length and a format from the data retrieve command, (c) retrieving any data in the representation of the host computer screen in the first guest computer's memory at the position and of the length in the data select command, and (d) converting the retrieved data into the format in the data retrieve command.

12. A program storage device readable by a machine, tangibly embodying a program of instructions executable by the machine to perform method steps for navigating a host computer as set forth in claim 5, the program further for use by a second guest computer comprising a second display, a second user input device and a second terminal emulation program, the second terminal emulation program displaying screen displays generated by the host computer and transmitted to the guest computer as representations on the second display, and the second terminal emulation program transmitting user input from the second user input device to the host computer as keystrokes, the method steps further comprising, during a second user's interaction with the host computer using the second terminal emulation program prior to the first user's interaction:

(a) creating and open the navigation path object, (b) detecting activation by the second user of a function on the second guest computer for creating the data select command in the navigation path object, (c) enabling the second user to mark on the representation of the host computer screen on the second guest computer's display an area from which data will be retrieved during playback, (d) enabling the second user to enter into the second guest computer using the second user input device the format into which the data retrieved from the host computer screen should be converted during playback, (e) determining the position and the length of the area as marked by the second user on the representation of the host computer screen, and (f) saving the data retrieve command including the position, the length and the format of the input field in the navigation path object.

* * * * *